US010391533B2

(12) United States Patent
Clausen et al.

(10) Patent No.: US 10,391,533 B2
(45) Date of Patent: Aug. 27, 2019

(54) METHOD FOR PRODUCING A MOTOR VEHICLE COMPONENT FROM AN EXTRUDED LIGHT METAL PROFILE

(71) Applicant: Benteler Automobiltechnik GmbH, Paderborn (DE)

(72) Inventors: Edvin List Clausen, Lojt Kirkeby Abenra (DK); Andreas Hitz, Erwitte (DE); Tobias Svantesson Kavik, Oslo (NO); Amin Farjad Bastani, Gjovik (NO)

(73) Assignee: BENTLER AUTOMOBILTECHNIK GMBH, Panderborn (DE)

( * ) Notice: Subject to any disclaimer, the term of this patent is extended or adjusted under 35 U.S.C. 154(b) by 10 days.

(21) Appl. No.: 15/411,614

(22) Filed: Jan. 20, 2017

(65) Prior Publication Data

US 2017/0209910 A1 Jul. 27, 2017

(30) Foreign Application Priority Data

Jan. 22, 2016 (DE) ........................ 10 2016 101 159

(51) Int. Cl.

| | |
|---|---|
| ***B21C 23/14*** | (2006.01) |
| ***B21C 23/00*** | (2006.01) |
| ***B21D 53/88*** | (2006.01) |
| ***B62D 29/00*** | (2006.01) |

(Continued)

(52) U.S. Cl.

CPC .......... *B21C 23/142* (2013.01); *B21C 23/002* (2013.01); *B21C 35/023* (2013.01); *B21D 53/88* (2013.01); *B62D 29/008* (2013.01); *B62D 65/00* (2013.01)

(58) Field of Classification Search

CPC ..... B21C 23/14; B21C 23/142; B21C 35/023; B21C 35/026; B21C 23/002

See application file for complete search history.

(56) References Cited

U.S. PATENT DOCUMENTS

| | | | |
|---|---|---|---|
| 5,603,581 | A | 2/1997 | Fujita et al. |
| 6,070,448 | A | 6/2000 | Eipper et al. |

(Continued)

FOREIGN PATENT DOCUMENTS

| | | |
|---|---|---|
| CN | 101386036 A | 3/2009 |
| CN | 202343609 U | 7/2012 |
| CN | 103394538 A | 11/2013 |

(Continued)

OTHER PUBLICATIONS

Office Action for Chinese Application No. 201710045039.9 dated Apr. 24, 2018; 20 pp.

(Continued)

*Primary Examiner* — Debra M Sullivan

(74) *Attorney, Agent, or Firm* — Hauptman Ham, LLP

(57) ABSTRACT

A method for producing a motor vehicle component from a light metal alloy includes: extruding an extruded profile with, in cross section, at least two mutually different wall thicknesses and at least one closed hollow chamber and with an extrusion width, at least partially flattening and/or widening the cross section to a processing width, wherein the processing width is greater than the extrusion width, before or after the flattening and/or widening, performing separation to form blanks, processing the blanks by deformation to form the motor vehicle component.

19 Claims, 19 Drawing Sheets

(51) Int. Cl.
*B62D 65/00* (2006.01)
*B21C 35/02* (2006.01)

(56) References Cited

U.S. PATENT DOCUMENTS

| | | | | |
|---|---|---|---|---|
| 9,193,390 | B1 | 11/2015 | Yoshida | |
| 2016/0325788 | A1 * | 11/2016 | Shirai | C22C 21/00 |

FOREIGN PATENT DOCUMENTS

| | | | |
|---|---|---|---|
| CN | 103521540 | A | 1/2014 |
| DE | 4333500 | A1 | 4/1995 |
| DE | 69413458 | T2 | 2/1999 |
| JP | H07144661 | A | 6/1995 |
| JP | H08174047 | A | 7/1996 |
| JP | 2002282981 | A | 10/2002 |
| JP | 2003145215 | A | 5/2003 |
| WO | 2016012009 | A1 | 1/2016 |

OTHER PUBLICATIONS

Office Action for Chinese Application No. 201710045039.9 dated Jan. 4, 2019; 13pp.

* cited by examiner

FIG. 5c
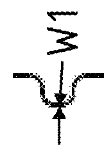
FIG. 5d
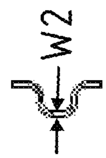
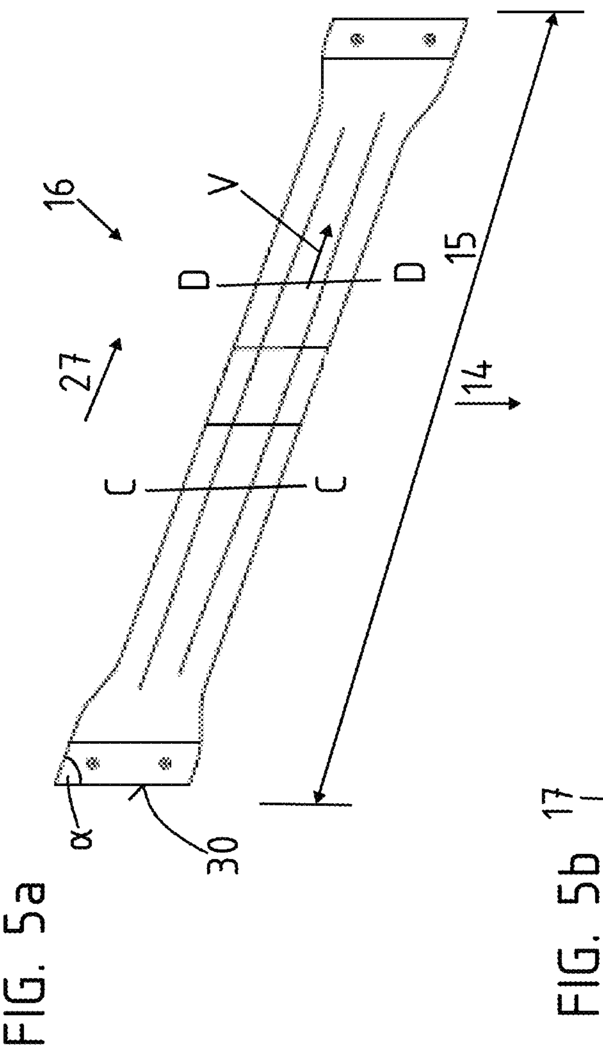
FIG. 5a
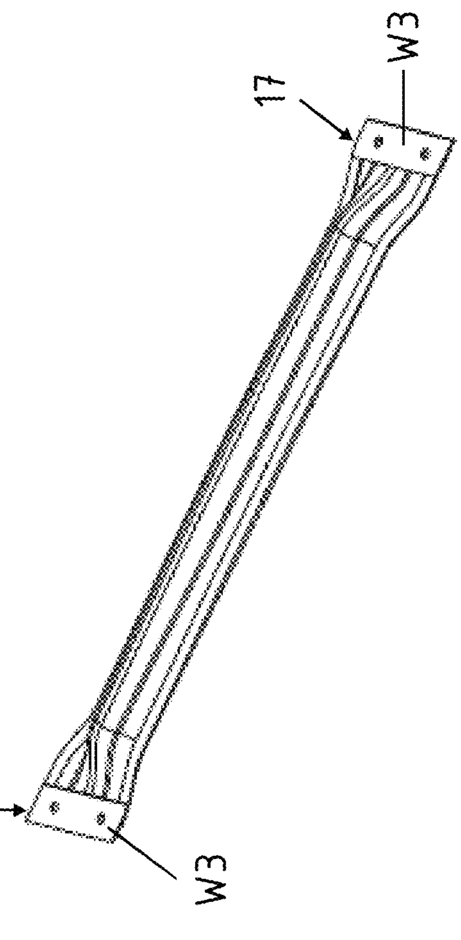
FIG. 5b

METHOD FOR PRODUCING A MOTOR VEHICLE COMPONENT FROM AN EXTRUDED LIGHT METAL PROFILE

RELATED APPLICATIONS

The present application claims priority from German Application Number 10 2016 101 159.2, filed Jan. 22, 2016, the disclosure of which is hereby incorporated by reference herein in its entirety.

FIELD

The present invention relates to a method for producing a motor vehicle component from a light metal alloy.

BACKGROUND

To produce motor vehicle bodies, use is normally made of motor vehicle structural components and body components. These are normally manufactured from sheet steel, such that, firstly, adequate freedom in terms of shaping is obtained, and secondly, adequate strength is achieved. Here, the production method normally provides for a sheet-metal blank to be provided which is placed into a deformation tool, in particular into a pressing deformation tool, and which is then deformed by pressing, such that the sheet-metal component is finally shaped to form a motor vehicle component.

In the context of the logical demand for lightweight construction, motor vehicle body components and in particular motor vehicle structural components are produced by way of hot working and press hardening in order to lower the specific component weight with the use of a steel alloy, while at least maintaining or else increasing strength.

Alternatively, motor vehicle components are produced from light metal, wherein here, use is made in particular of aluminum alloys. In this case, too, sheet-metal blanks produced by rolling and composed of light metal, in particular of aluminum, are provided, which are placed into a pressing deformation tool and are finally shaped to form the motor vehicle component.

To further improve the component characteristics with regard to a decreasing component weight while at least maintaining or else increasing stiffness, components with mutually different wall thicknesses are produced. Those component regions which are intended to exhibit high stiffness and/or high resistance forces in the event of a vehicle crash have, for this purpose, an increased wall thickness, and component regions which are subjected to lower load, have a relatively small wall thickness. To produce the components, sheet-metal blanks produced by rolling and with mutually different wall thickness are provided, which are known as Tailored Material. A Tailored Blank Material of said type is produced either by flexible rolling (Tailor Rolled Blank) or else by virtue of sheet-metal blanks with mutually different wall thickness being welded together (Tailor Welded Blank).

The production costs of such Tailored Materials are relatively high, wherein the width of the transition regions of the various wall thicknesses to one another is for example dependent on the degree of rolling or else the thermal joining in the case of a welded Tailored Plate. The joining furthermore gives rise to stressors in the starting material, and can give rise to a weak point in the subsequent component.

SUMMARY

It is an object of the present invention to specify a method for producing a motor vehicle component, by means of which method it is possible for a weight-optimized and loading-optimized component with good shaping possibilities to be produced cost-effectively from a light-metal alloy.

According to the invention, the abovementioned object is achieved by way of a method for producing a motor vehicle component from a light metal alloy.

Advantageous design variants of the method according to the invention. These are also described herein.

The method for producing a motor vehicle component from a light metal alloy is characterized by the following method steps:

- extruding an extruded profile with, in cross section, at least two mutually different wall thicknesses and at least one hollow chamber which is of closed cross section and with an extrusion width,
- at least partially flattening and/or widening the cross section to a processing width, wherein the processing width is greater than the extrusion width,
- before or after the flattening and/or widening, performing separation to form blanks, The extruded profile is in particular extruded with a cross section which differs from a planar blank, particularly preferably with an undulating or multiply curved cross section. It is furthermore provided that at least one closed hollow chamber is jointly extruded in the extruded profile. It is preferably also possible for multiple hollow chambers to be extruded. Here, the extruded profile has an extrusion width. By way of the extrusion process, it is possible for mutually different wall thicknesses and/or different arrangements of the at least one hollow chamber in the cross section to be produced in a targeted and loading-optimized manner. A diagonal of the extruded profile may in this case be greater than the extrusion width.

In a further method step, the extruded profile is flattened and/or widened in cross section. This yields a processing width which is greater than the extrusion width. The processing width is preferably more than 1.1, in particular more than 1.2, particularly preferably 1.5 times wider than the extrusion width. The processing width is particularly preferably more than 1.8 times and in particular more than two times as wide as the extrusion width. In the context of the invention, it is also possible for the processing width to be considerably greater than 2 times the extrusion width.

The at least one hollow chamber is also preferably widened and/or flattened. The processing width is preferably at least 10% greater, preferably at least 20%, in particular at least 30% greater, than the extrusion width. This means that the processing width has a width which is greater than 1.1 times, in particular greater than 1.2 times, preferably greater than 1.3 times, the extrusion width.

Before or after the flattening and/or widening, the extruded profile is separated into blanks. The blanks thus produced are then processed further, by way of processing by deformation, to form the motor vehicle component. This may be realized for example by way of pressing deformation.

A particularly preferred design variant of the method according to the invention provides that the hollow chamber is still maintained after the flattening and/or widening. This means that the at least one hollow chamber itself has not been flattened, but rather is still in the form of a hollow chamber in cross section. The cross-sectional configuration of the hollow chamber may however change as a result of the flattening and/or widening.

It is furthermore particularly preferable for the at least one hollow chamber to be cut in the extrusion direction or in the longitudinal direction of the extruded profile, such that, in the extrusion direction or in the longitudinal direction of the extruded profile, the hollow chamber is formed only in portions.

The extruded profile is furthermore particularly preferably formed such that the at least one hollow chamber is produced with at least one flange projecting on one side in a cross-sectional direction, with flanges preferably projecting on two sides.

In a further preferred design variant of the invention, at least two hollow chambers are formed adjacent to one another. This means that said hollow chambers are situated immediately adjacently next to one another. This is also referred to as a double hollow chamber profile. In the context of the invention, it is also possible for three or more hollow chambers to be formed so as to be situated immediately adjacent to one another.

It is however also possible for at least two hollow chambers to be formed so as to be connected to one another by a web. This means that, between two hollow chambers, there is formed not a closed hollow chamber but rather, in this context, merely a web. It is also possible for the two abovementioned options to be combined with one another, such that, for example, in one section of the cross section, a double hollow chamber profile is formed and, adjacent to the latter, a further hollow chamber is formed, wherein the double hollow chamber profile and the hollow chamber are then connected by a web. Owing to the extrusion, the cross section is always of unipartite and materially integral form.

It is particularly preferable for the at least one hollow chamber to be reduced in height and increased in width during the widening and/or flattening.

It is furthermore particularly preferably provided that the flattened and/or widened blank or extrusion profile are cut at an angle of between 0 and 90°, in particular between 5 and 85°, with respect to the extrusion direction, with cutting particularly preferably being performed at an angle of between 60° and 90°, particularly preferably between 65° and 85°, with respect to the extrusion direction. By way of this measure, it is made possible for a component length of the motor vehicle component to be produced to be greater than the processing width. It is thus possible firstly by way of the flattening and/or widening of the extruded profile and furthermore by way of the above-described oblique cutting, performed at an angle, to realize a component length which is in particular more than 1.5 times, particularly preferably more than 2 times and in particular more than 2.2 times, particularly preferably more than 2.5 times, the extrusion width, and which is preferably also greater than the processing width, owing to oblique cutting.

Altogether, with the method according to the invention, it is possible to realize processing widths of 150 to 1200 mm. The possible component length may, by way of the oblique cutting, even be greater than the processing width and thus greater than the above-described 1200 mm.

It is particularly preferable for 5000 series, 6000 series or 7000 series aluminum alloys to be processed, wherein yield strengths Rp 0.2 of greater than or equal to 450 MPa can be achieved. For this purpose, at least one heat treatment may be provided, in particular artificial aging of the extruded profile or preferably of the produced component.

It is particularly preferably possible for wall thicknesses of 1 to 10 mm to be extruded. In particular, wall thicknesses of 2 to 5 mm are extruded, wherein the wall thicknesses differ from one another in the cross section of the extruded profile. It is thus possible, for example, for wall thicknesses of 3 to 5 mm to be produced in one part of the cross section, whereas other wall thicknesses may be produced in an interval of 1 to 3 mm. This however does not restrict the invention. It is possible for numerous mutually different wall thicknesses to be produced in one cross section.

The deformation for performing the processing by deformation is performed in particular in a progressive tool, in particular in a two-stage, three-stage, preferably four-stage, particularly preferably five-stage and very particularly preferably six-stage progressive tool. In particular in the case of the production of relatively small components, it is the case that at least two of the following process steps are performed in the progressive tool:

- extending and/or elongating and/or stretching the blank or an extruded profile unwound from a coil,
- edge cutting of the blank or of the extruded profile unwound from the coil,
- deformation to form the motor vehicle component,
- hole punching,
- hole forming,
- separation.

Here, the process steps may be combined in any desired sequence in the progressive tool.

In particular, it is thus possible by way of the method according to the invention to realize the possibility of forming a component which, in cross section, has at least one hollow chamber at least in portions over its longitudinal extent. By contrast to components composed of extrusion profiles known from the prior art, the component may in this case however realize a relatively large component width in relation to the component length owing to the flattening and/or widening step according to the invention. The component length itself may be produced both in the extrusion direction but also substantially transversely with respect to the extrusion direction.

Further advantages, features, characteristics and aspects of the present invention will be discussed in the following description. Preferred design variants are illustrated in the schematic figures. These serve for ease of understanding of the invention. In the figures:

BRIEF DESCRIPTION OF THE DRAWINGS

For an understanding of embodiments of the disclosure, reference is now made to the following description taken in conjunction with the accompanying drawings, in which:

FIGS. 5*a* to 5*d* show a door impact beam produced by way of the method illustrated in FIGS. 4*a* to *c*.

In the figures, the same reference designations are used for identical or similar components, even if a repeated description is omitted for reasons of simplicity.

DETAILED DESCRIPTION

Figure 1A:
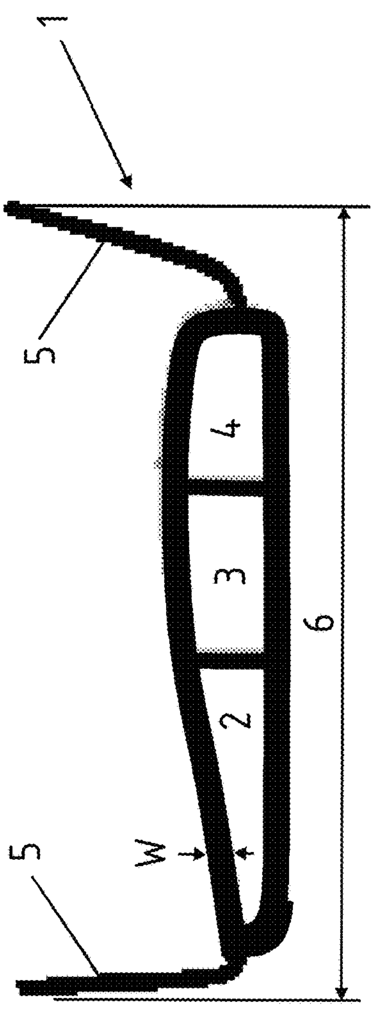
FIGS. 1*a* and 1*b* show an extruded profile extruded by way of the method according to the invention, after the extrusion and after the widening.
Figure 1B:
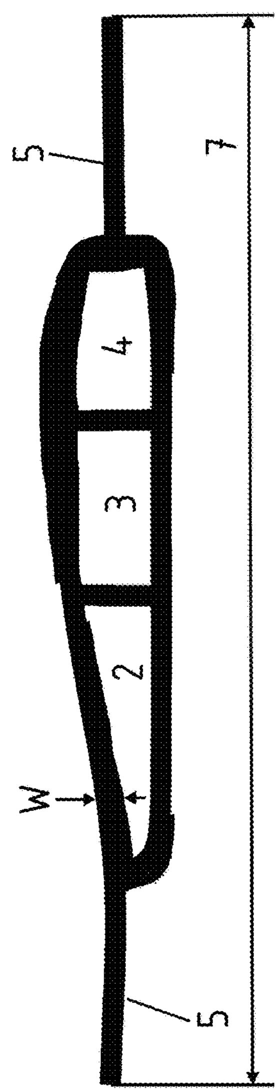

FIG. 1*a* shows an extruded profile 1 produced by way of the method according to the invention. The extruded profile 1 has a total of three hollow chambers 2, 3, 4 and has two flanges 5 which project laterally from the outer hollow chambers 2, 4. Altogether, the extruded profile 1 has an extrusion width 6, and has wall thicknesses W which differ from one another in cross section, wherein the wall thickness may be selected as desired on the basis of the extrusion process. In a subsequent processing step as per FIG. 1*b*, the extruded profile 1 is flattened, such that, as illustrated here, the lateral flanges 5 are substantially bent downward. Following this, the flattened or widened extruded profile 1 has a processing width 7 which is greater than the extrusion width 6. Thereafter, further processing by deformation can be performed. It is also possible, during the flattening, for the hollow chambers 2, 3, 4 to be flattened, though this is not shown.

Figure 2A:
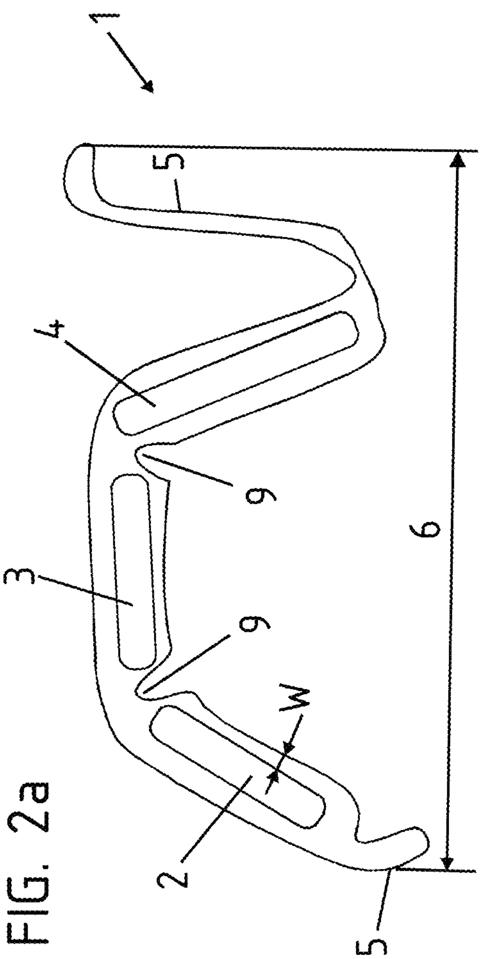
FIGS. 2*a* and 2*b* show an extruded profile extruded by way of the method according to the invention, after the extrusion and after the widening.

FIG. 2 shows an alternative design variant. Firstly, as per FIG. 2*a*, an extrusion profile 1 is produced which, altogether, has an undulating cross section. Said extrusion profile in turn has three directly adjacent hollow chambers 2, 3, 4 and has flanges 5 projecting laterally therefrom. The wall thickness W is selected so as to facilitate the following pressing forming step.

Figure 2B:
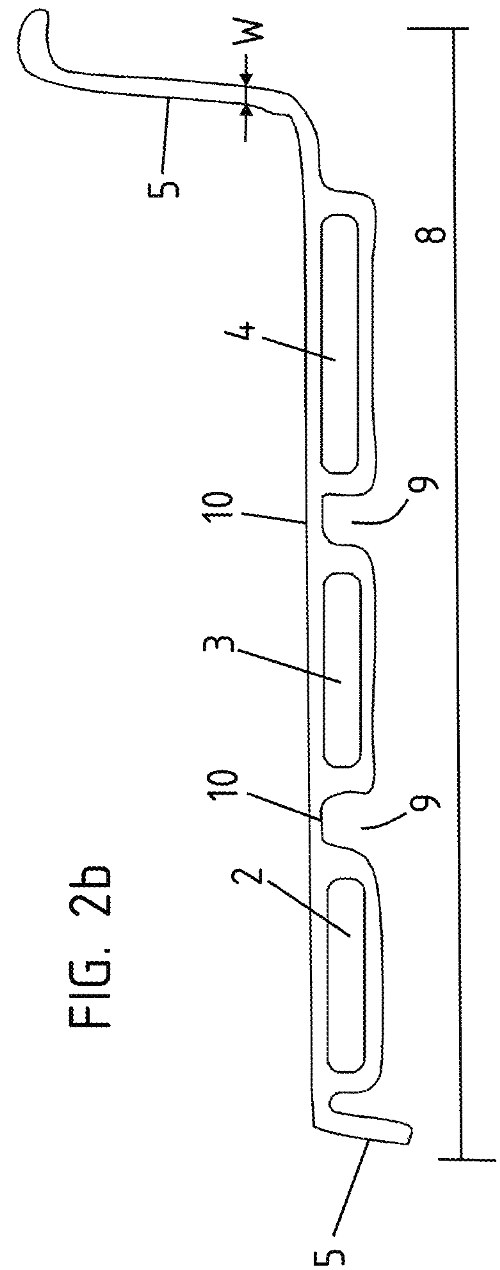
Figure 3:
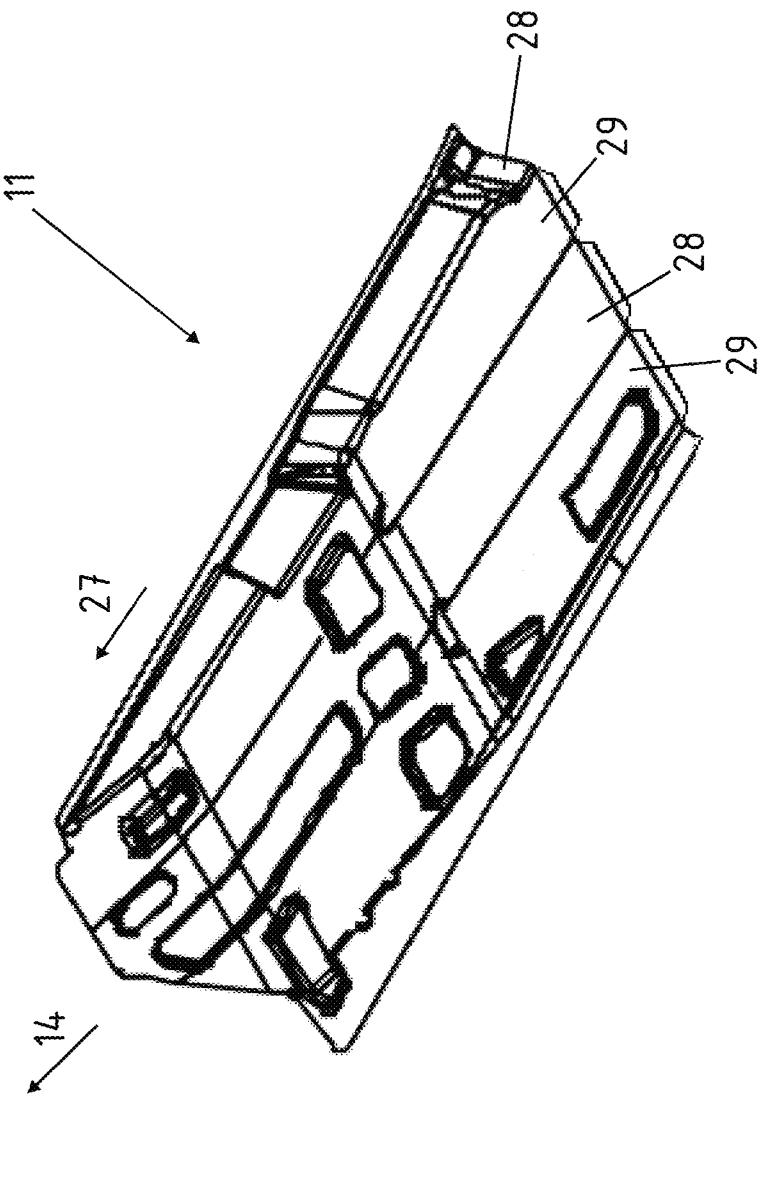
FIG. 3 shows a floor panel, produced by way of the method according to the invention, of a motor vehicle.

FIG. 2*b* shows the extrusion profile between the hollow chambers 2, 3, 4 after the widening or flattening and, in this case, a further pressing deformation step. For this purpose, the extrusion profile has a component width 8 which is likewise greater than the extrusion width 6. The right-hand flange 5 in relation to the plane of the drawing and the left-hand flange 5 in relation to the plane of the drawing have each, by way of the pressing deformation, been altered so as to stand at an angle relative to the hollow chambers 2, 3, 4 arranged in the middle. Grooves 9 are formed between the hollow chambers, which grooves promote the widening. The hollow chambers 2, 3, 4 are connected to one another by webs 10. For example, it is in particular possible for a floor panel 11 shown in FIG. 3 to be produced in accordance with the design variant of FIGS. 2*a* and *b*.

Here, the longitudinal direction 27 is oriented in the extrusion direction 14 of the blank. Consequently, in the longitudinal direction 27, there are formed thick regions 28 and, arranged in between these, thin regions 29.

Figure 4A:
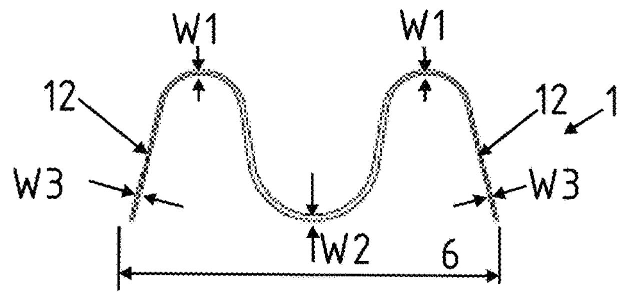
FIGS. 4*a* to 4*c* show a production method according to the invention in the individual process steps.
Figure 4B:
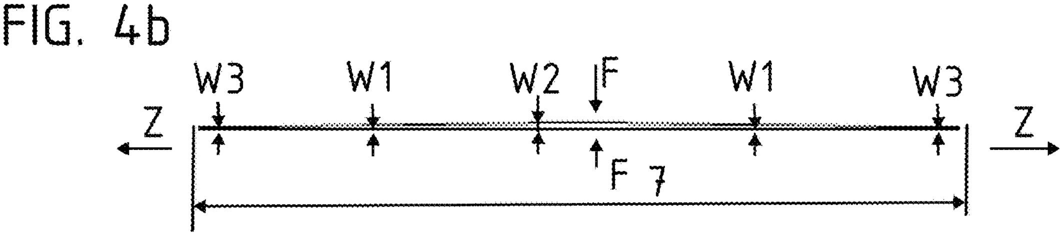
Figure 4C:
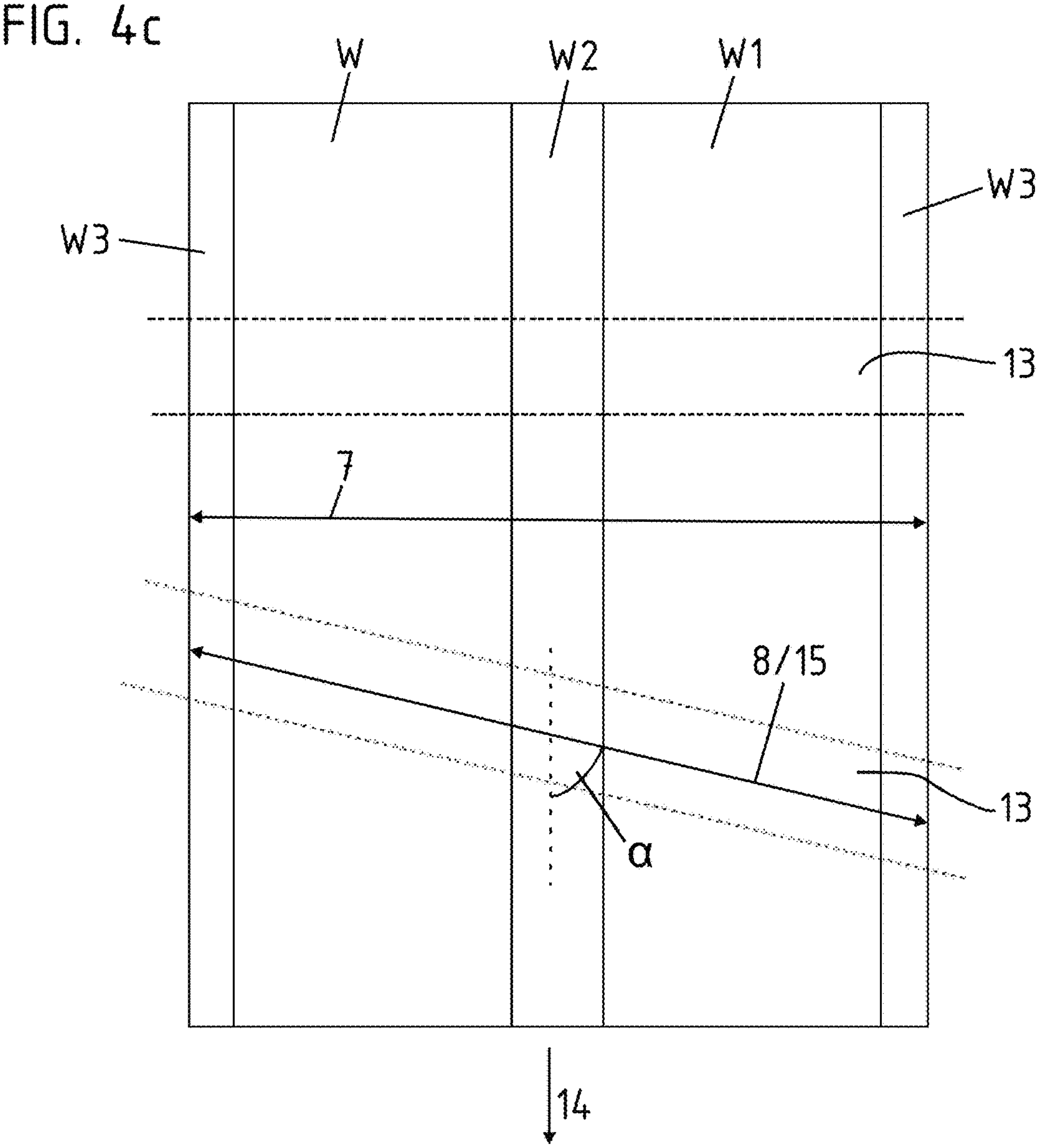

FIGS. 4*a* to *c* show a method according to the invention for producing an extruded profile 1, from the flattening or widening to the separation and/or cutting of the blanks 13 thus produced. In FIG. 4*a*, an extruded profile 1 with an undulating cross section is produced. Here, a wall thickness W2 arranged in the middle is greater than a wall thickness W3 arranged at the outer sides, and in between, a transition with the varying wall thickness W1 which decreases from the wall thickness W2 to the wall thickness W3. A thickness transition from wall thickness W1 to wall thickness W3 in the form of a thickness step change 12 can thus be easily produced owing to the extrusion. Said extruded profile 1 in turn has an extrusion width 6. In the region of the thickness step change 12, it is thus possible for a transition region which is very narrow in cross section to be realized, by contrast to a rolling process.

The extrusion is followed by a flattening or widening, illustrated in FIG. 4*b*. The flattening or widening may, in the context of the invention, be performed by way of a pressing deformation tool, such that, owing to a pressing force F which acts on the component from above and/or below, said component can be widened, though additionally or alternatively by way of tensile deformation, such that the component is widened owing to a tensile force Z acting on the end. As a result, by way of separation of the extruded profile 1, blanks 13 are produced which have a processing width 7 greater than the extrusion width 6. Said blanks 13 can then initially be stored and/or processed further, in particular on the basis of a blank outline. The blank 13 is preferably cut at an angle α with respect to the extrusion direction 14, such that in this way, a component width 8 or component length 15 can be realized which is greater than the processing width. For this purpose, the angle α is particularly preferably between 70° and 90° relative to the extrusion direction 14. It is however also possible for a component cut to be produced which is formed transversely with respect to the extrusion direction 14. In this case, the component length substantially corresponds to the processing width 7.

For example, by way of the method sequence illustrated in FIG. 4, a door impact beam 16 produced in FIGS. 5*a* to *d* can be formed. Instead of the separation by blank outline before the deformation, it may also be provided that the components are separated only in one of the final steps.

FIG. 5*a* shows a plan view, FIG. 5*b* shows a perspective view and FIGS. 5*c* and 5*d* show a cross-sectional view as per the section lines C-C and D-D from FIG. 5*a*. The door impact beam 16 may in this case have in each case an outer attachment region 17 and a component region extending in between. Here, the wall thicknesses W2, W3 and the transition W1 exist in the component. Here, the component length 15 has been produced on the basis of an oblique cut performed at an angle with respect to the extrusion direction 14, and said component length is thus greater than the processing width 7 as per FIG. 4. In FIG. 5*b*, it can be clearly seen that, after the cutting of the blank, a three-dimensional deformation is produced, for example by way of pressing deformation. The outer edges 20 are preferably oriented obliquely relative to a longitudinal direction 27 owing to an oblique cut. This is shown by the angle α.

Figure 6:
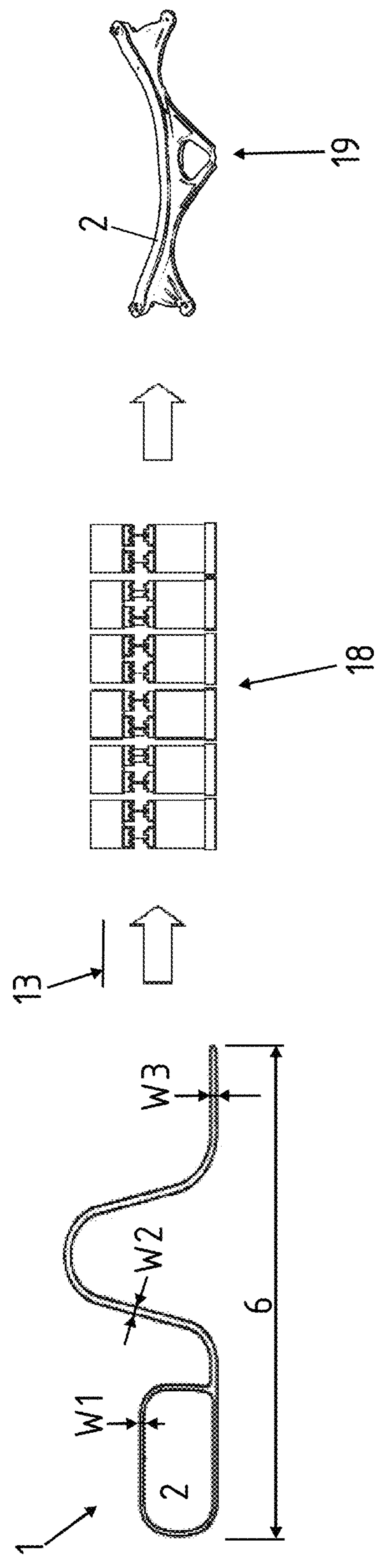
FIG. 6 shows a method sequence according to the invention for the production of a motor vehicle component in the form of a suspension cross-brace.

FIG. 6 shows the method sequence according to the invention. Firstly, an extruded profile 1 is produced which has a hollow chamber 2 and mutually different wall thicknesses W1, W2, W3 and an extrusion width 6. The wall thickness W1 is smaller than the wall thickness W2 and also smaller than the wall thickness W3. The wall thickness W3 is smaller than the wall thickness W2. The extruded profile 1 thus produced may preferably, after the extrusion, be separated into individual blanks 13, wherein the blanks 13 are then supplied to a progressive tool 18, illustrated in this case in the form of a six-stage progressive tool 18. In the progressive tool 18, it is then possible, if this has not been performed already, for the blanks 13 to be widened and/or flattened and to be produced so as to form the motor vehicle component 19 by way of various cutting and deformation and extending operations. Said motor vehicle component is for example in the form of a suspension cross-brace and has the above-described hollow chamber 2 over the full extent in a longitudinal direction. Instead of the progressive tool 18, a transfer press may also be used.

Figures 7A, 7B, 7C:
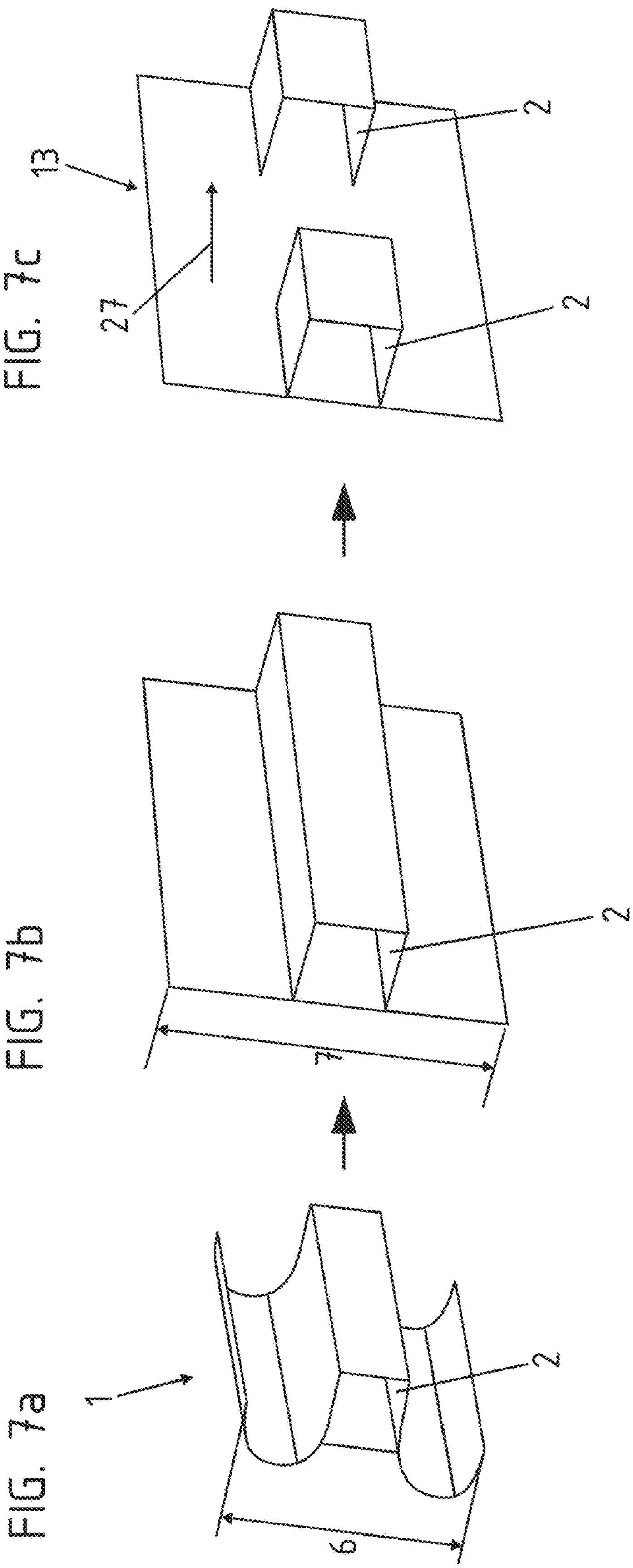
FIGS. 7*a* to 7*c* show a method sequence for the production of a hollow chamber which is formed only in portions in a longitudinal direction.

FIG. 7 shows an extruded profile 1 according to the invention with an uneven cross section and with a hollow chamber 2. Said extruded profile is flattened from an extrusion width 6 as per FIG. 7*a* to a processing width 7 illustrated in FIG. 7*b*, and in a further processing step as per FIG. 7*c*, the hollow chamber 2 is, in the longitudinal direction of the blank 13 thus produced, processed by cutting in the longitudinal direction 27 in length portions, such that the hollow chamber 2 is formed only in portions in the longitudinal direction of the blank 13. In this example, the same hollow chamber 2 is of unchanged form in cross section, but is also formed so as to be removed in parts over length portions.

Figure 8:
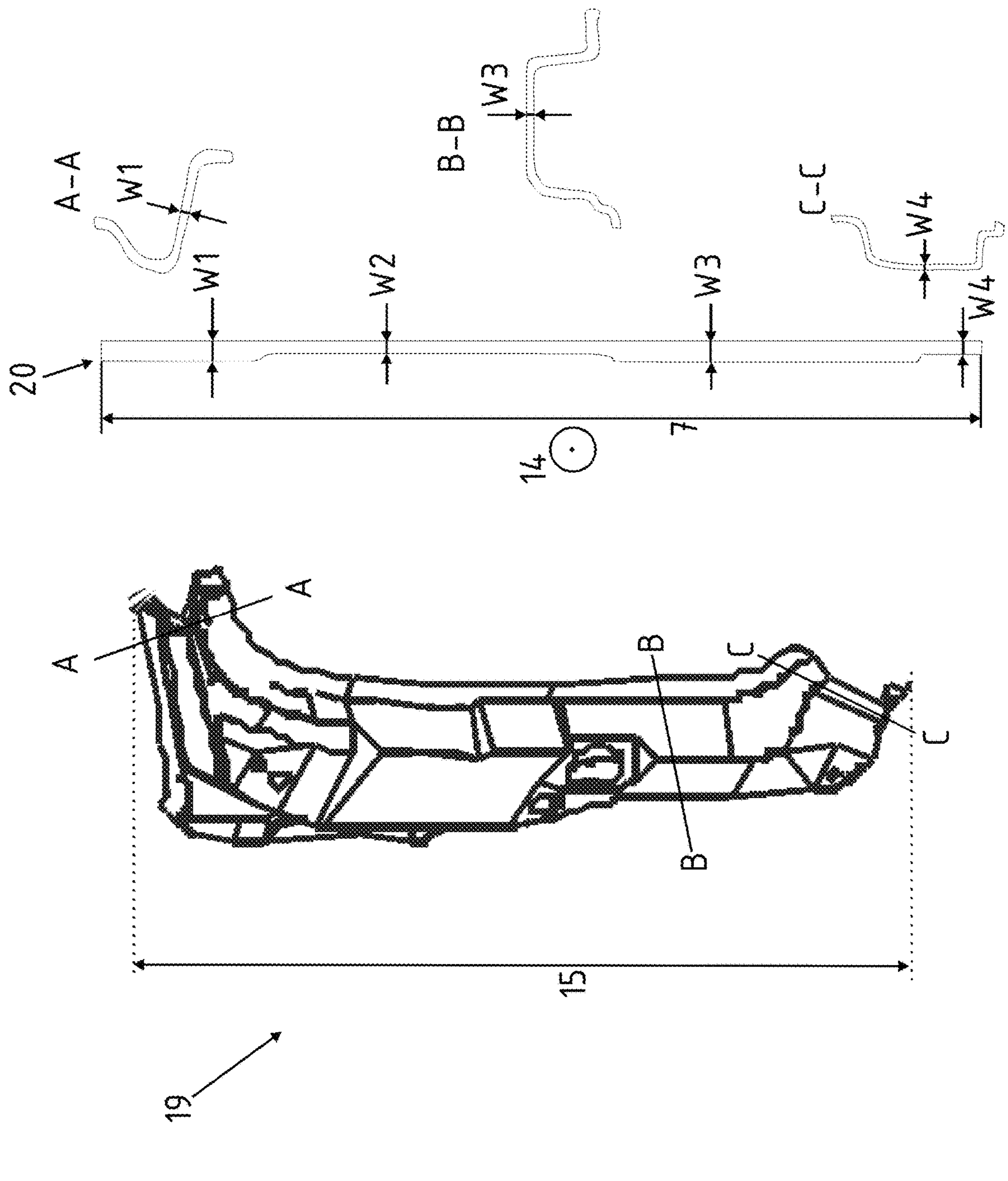
FIG. 8 shows a motor vehicle pillar.

FIG. 8 shows a motor vehicle component 19 produced according to the invention in the form of a motor vehicle pillar, in this case in particular an A pillar. In the cross-sectional views A-A, B-B and C-C, there is provided in each case a wall thickness which is of homogeneous cross section, wherein a longitudinal section 20 shows that mutually different wall thicknesses W1, W2, W3, W4 are produced in the longitudinal direction. Said mutually different wall thicknesses W1, W2, W3, W4 may be produced by way of the method according to the invention, such that the extrusion direction 14 is depicted on the plane of the drawing in relation to the longitudinal section 20. The processing width that can be achieved here is, owing to the following three-dimensional pressing deformation, slightly greater than the component length 15 with which the component can be produced.

Figure 9:
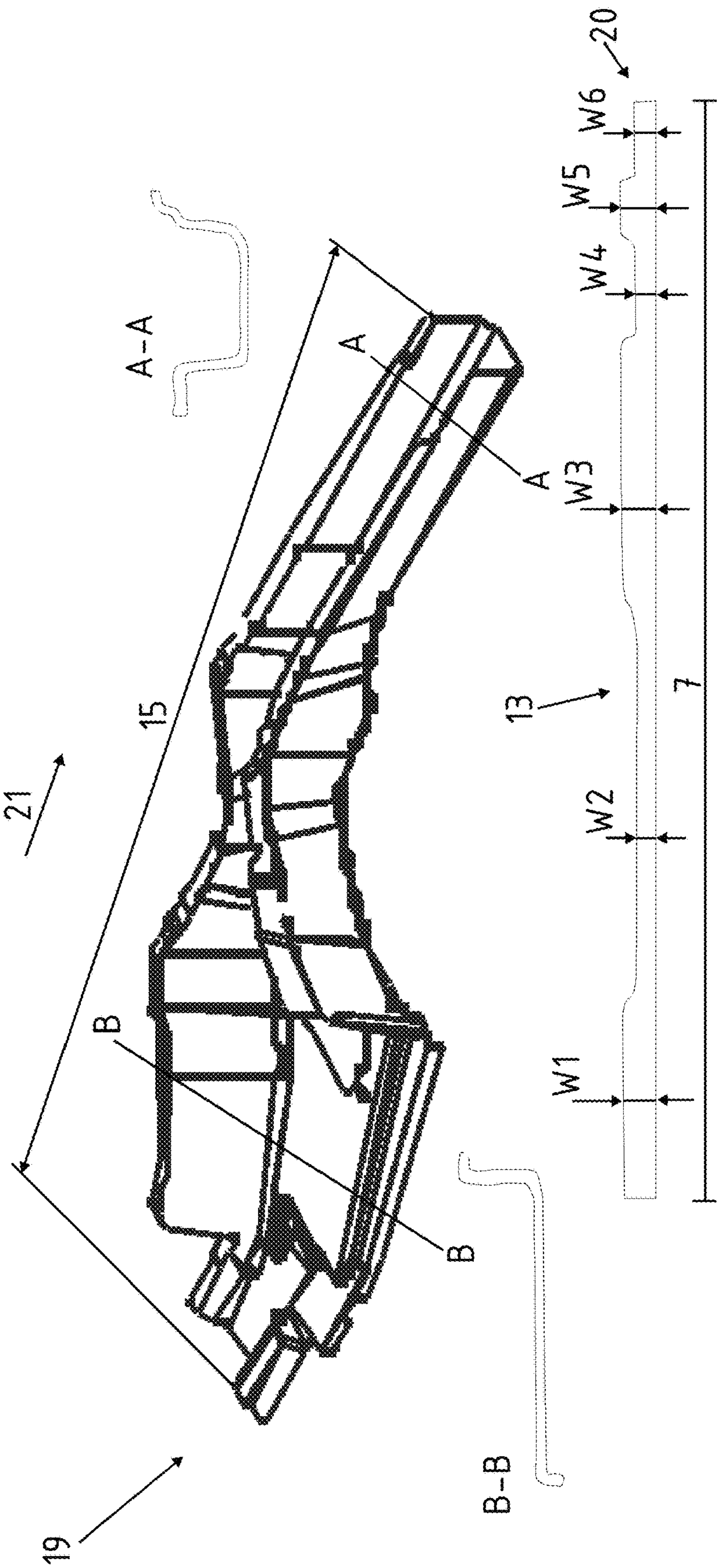
FIG. 9 shows a longitudinal beam lower shell.

FIG. 9 shows a further motor vehicle component 19 produced in accordance with the invention, based on the example of a longitudinal beam and, in this case, in particular, a longitudinal beam lower shell or internal reinforcement. In this case, in turn, two cross sections are illustrated as per the section lines A-A and B-B. The blank 13 initially to be processed has a processing width 7 and, in cross section, mutually different wall thicknesses W1, W2, W3, W4, W5, W6. Proceeding from the illustrated blank 13, the component is processed by deformation such that the component longitudinal direction 21 extends in the direction of the processing width 7. Furthermore, the processing width 7 substantially corresponds to the component length 15. A change in length, for example owing to three-dimensional processing by pressing deformation, is allowed for here.

Figure 10:
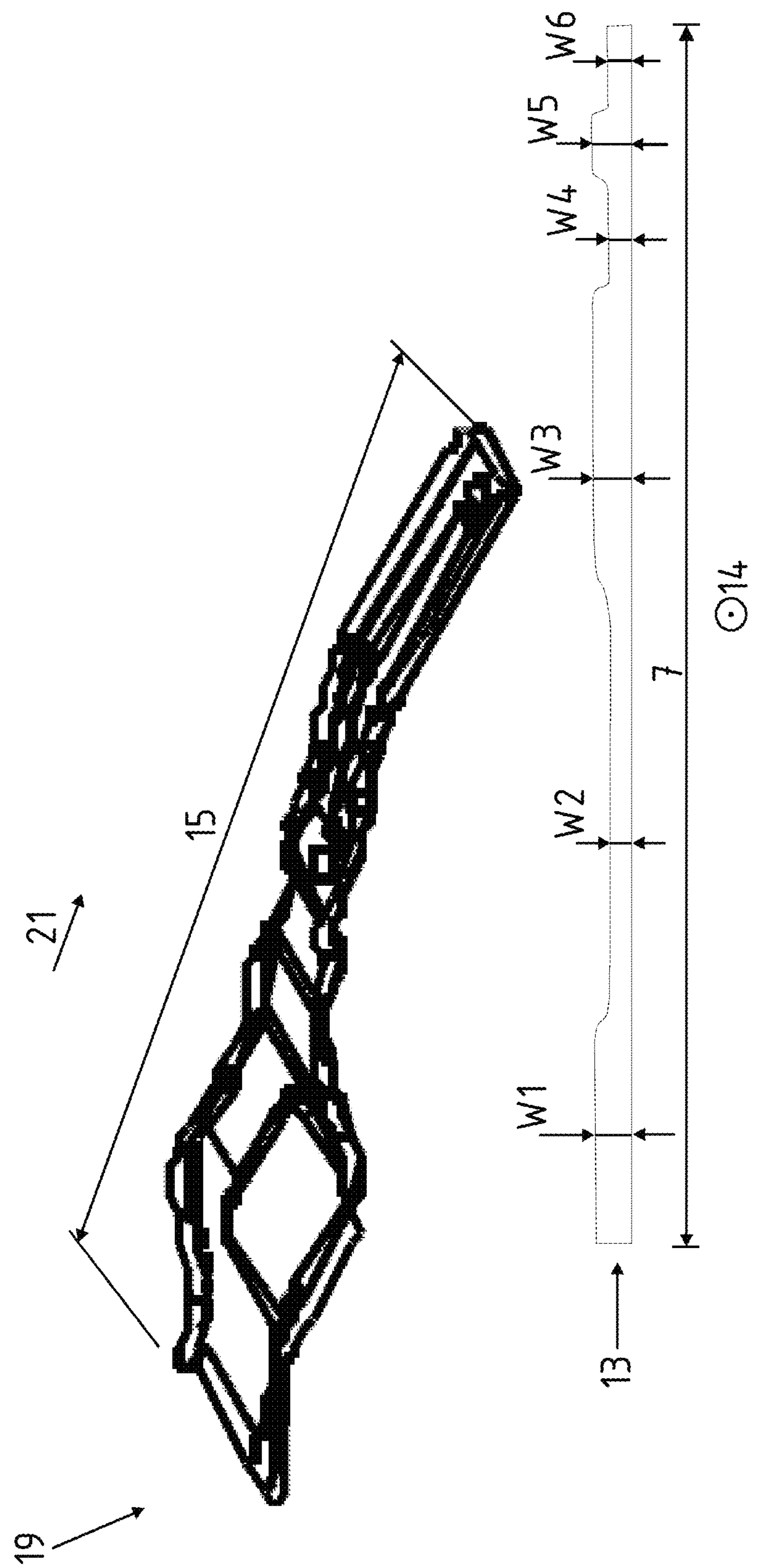
FIG. 10 shows a closure plate of a longitudinal beam.

FIG. 10 shows a further produced motor vehicle component 19 for a longitudinal beam, for example an upper shell or a closing plate. In this case, too, it can be clearly seen that the component has been processed by pressing deformation three-dimensionally, wherein, in this case, too, it is in turn the case that the component longitudinal direction 21 extends transversely with respect to the extrusion direction 14, and thus the component length 15 substantially corresponds to the processing width 7 of the blank 13. In this case, too, the blank 13 in turn has mutually different wall thicknesses W1, W2, W3, W4, W5, W6 in cross section.

Figure 11:
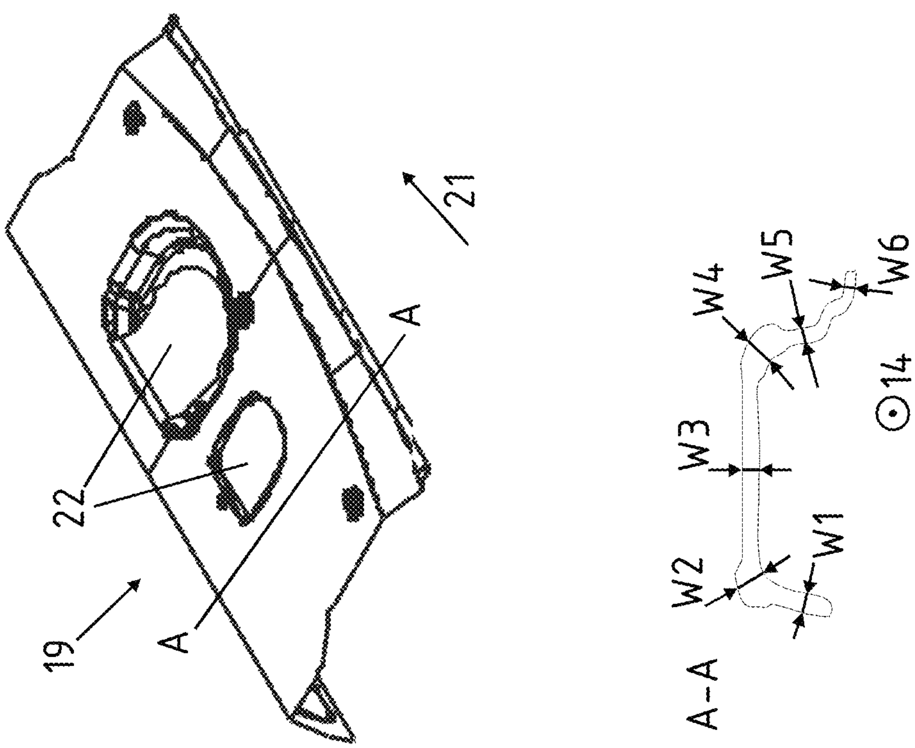
FIG. 11 shows a rear-window shelf.

FIG. 11 shows a motor vehicle component 19 in the form of a rear-window shelf in a sectional view with mutually different wall thicknesses W1, W2, W3, W4, W5, W6. The component longitudinal direction 21 is in this case itself oriented in the extrusion direction 14. The component itself has recesses 22 that can be produced by processing by cutting.

Figure 12:
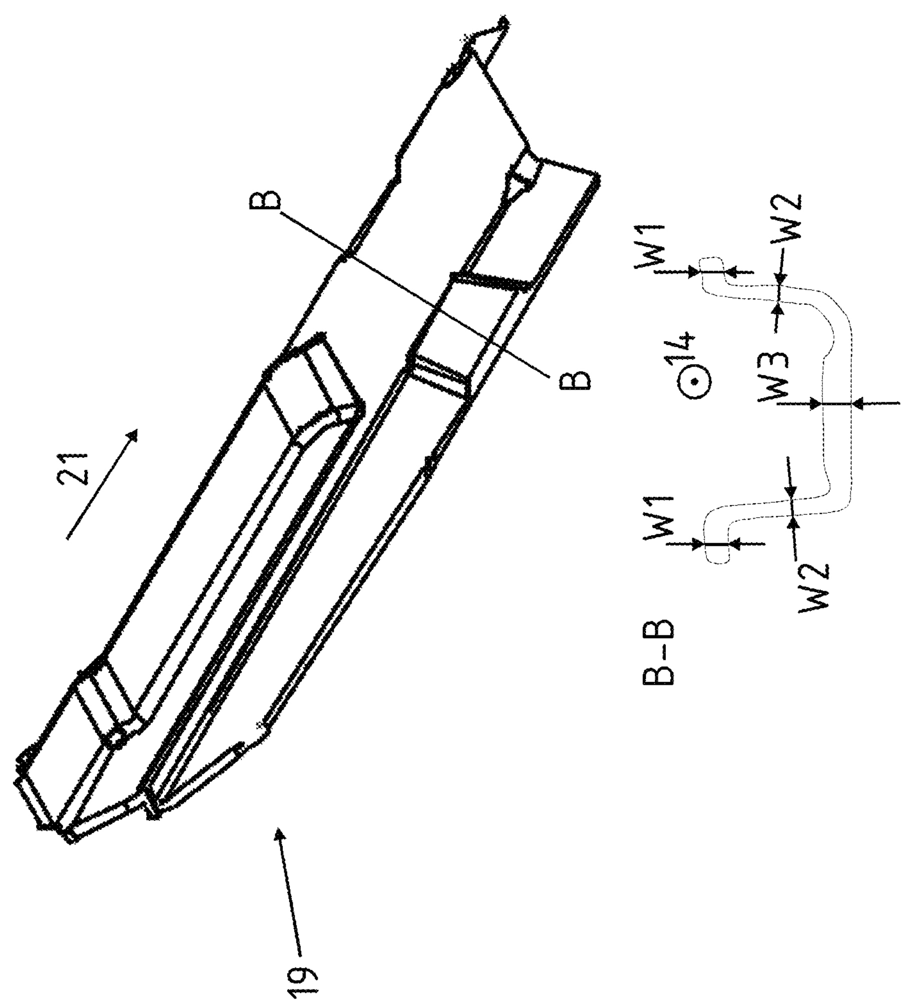
FIG. 12 shows a transmission tunnel.

FIG. 12 shows a motor vehicle component 19 in the form of a tunnel, in particular transmission tunnel. In the sectional view B-B, mutually different wall thicknesses W1, W2, W3 are realized in the cross section. The component longitudinal direction 21 corresponds in this case to the extrusion direction 14.

Figure 13:
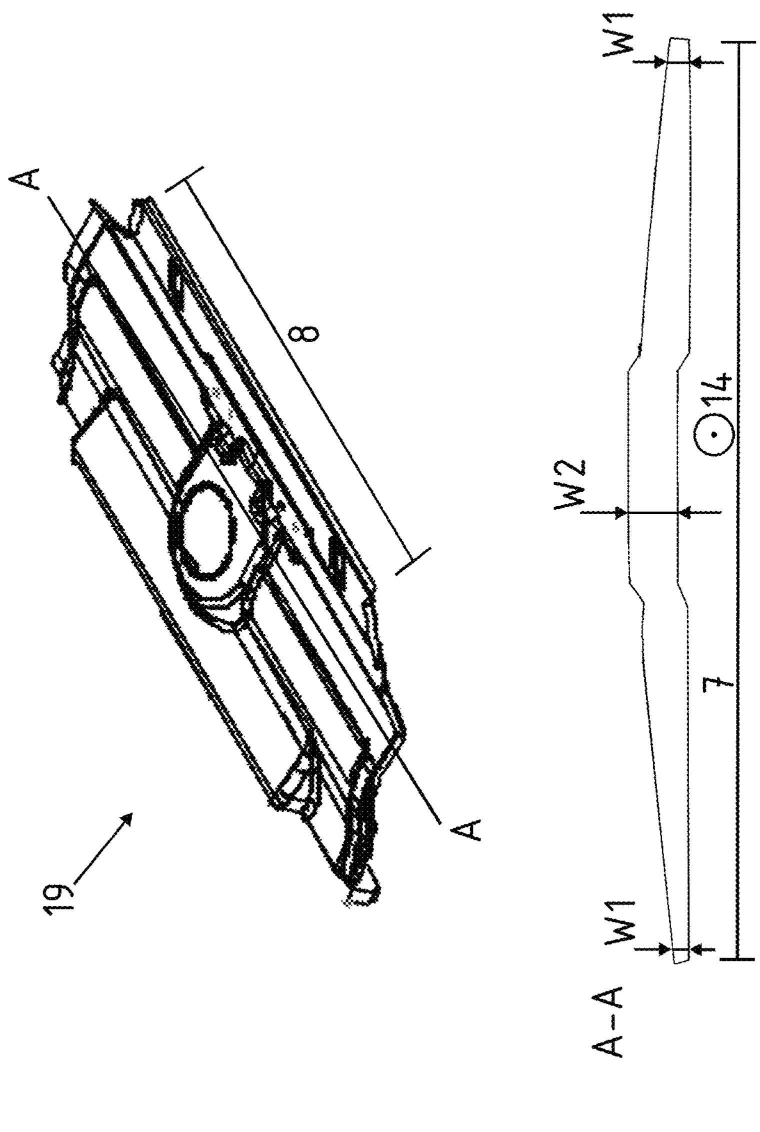
FIG. 13 shows a rear floor plate.

FIG. 13 shows a motor vehicle component 19 in the form of a rear floor plate. In the longitudinal sectional view A-A, the component has mutually different wall thicknesses W1, W2. Here, the component width 8 substantially corresponds to the processing width 7 of a blank.

Figure 14:
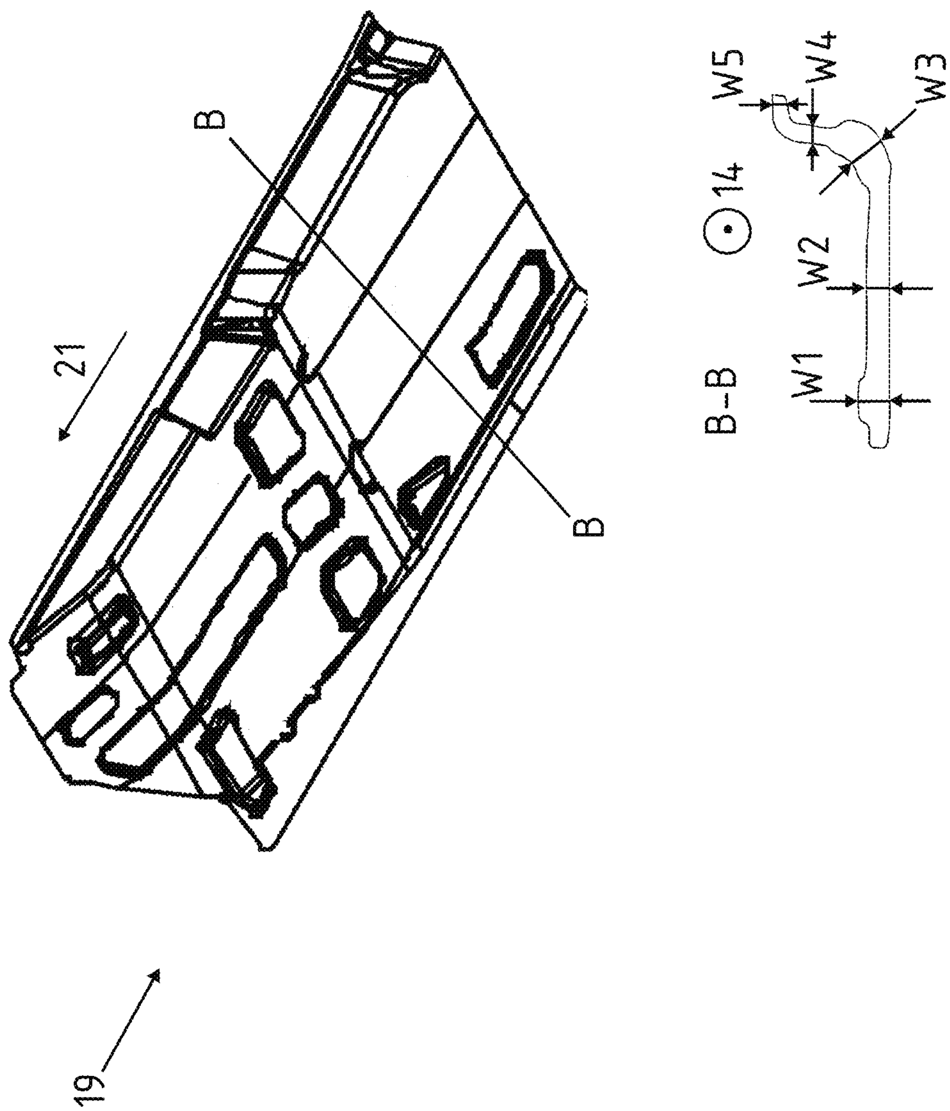
FIG. 14 shows a front floor plate.

FIG. 14 shows a motor vehicle component 19 in the form of a front floor plate. The floor plate is in turn formed with its component longitudinal direction 21 in the extrusion direction 14, wherein the cross section as per section line B-B has mutually different wall thicknesses W1, W2, W3, W4, W5.

Figure 15:
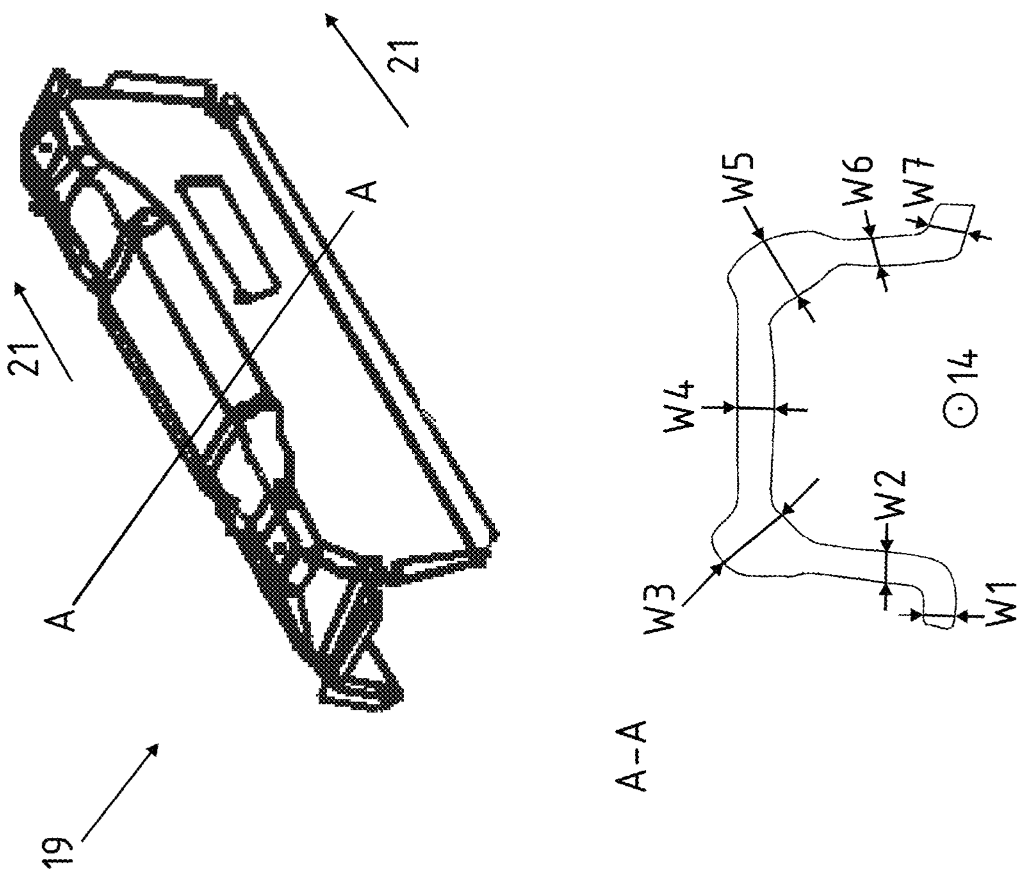
FIG. 15 shows a seat crossbeam.

FIG. 15 shows a motor vehicle component 19 in the form of a seat crossbeam, to which a vehicle seat (not illustrated in any more detail) or seat rails are fastened. Here, the seat crossbeam is also formed with its component longitudinal direction 21 in the extrusion direction 14. The cross section consequently has mutually different wall thicknesses W1, W2, W3, W4, W5, W6.

Figure 16:
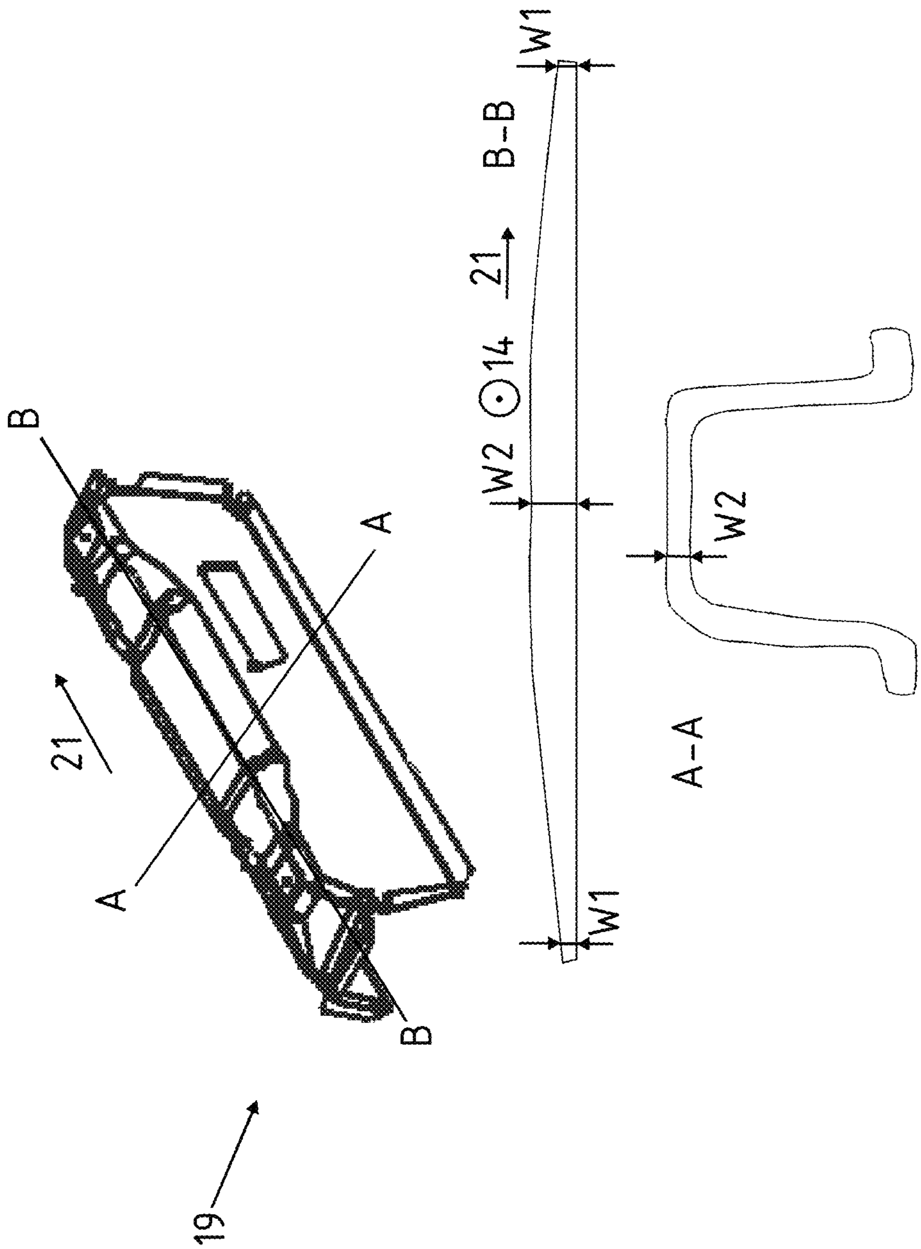
FIG. 16 shows an alternative seat crossbeam.
Figure 17A:
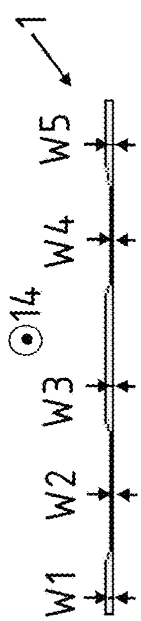
FIGS. 17*a* to 17*f* show a longitudinal beam.
Figure 17B:
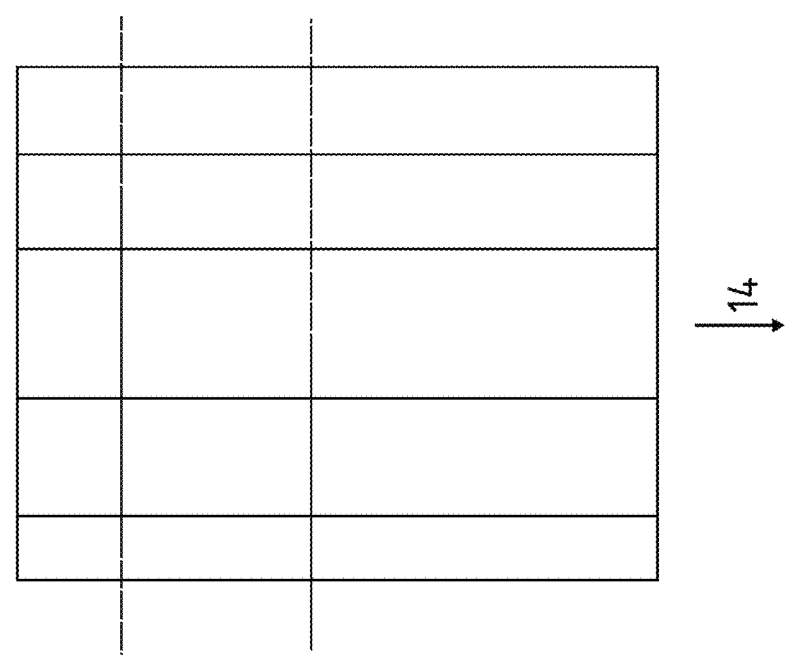
Figure 17C:
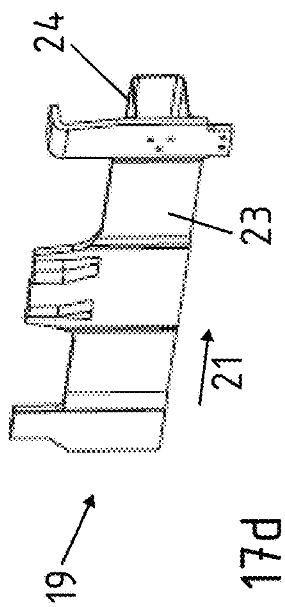
Figure 17D:
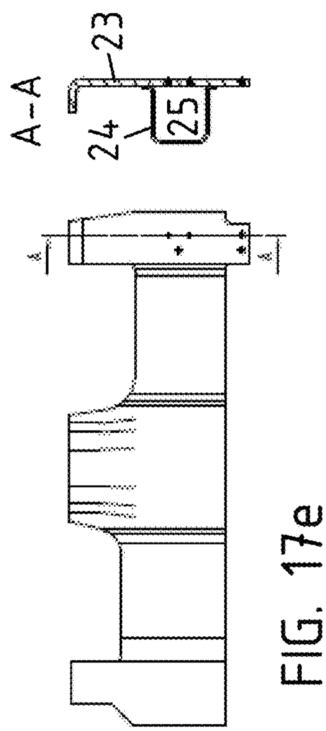
Figure 17E:
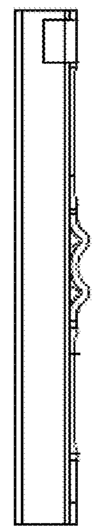
Figure 17F:
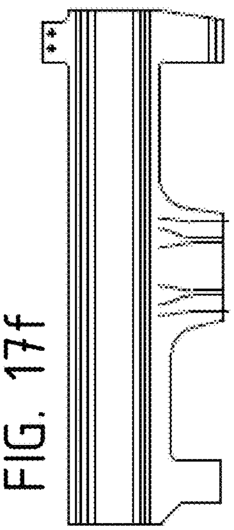
Figures 18A, 18B, 18C, 18D, 18E, 18F:
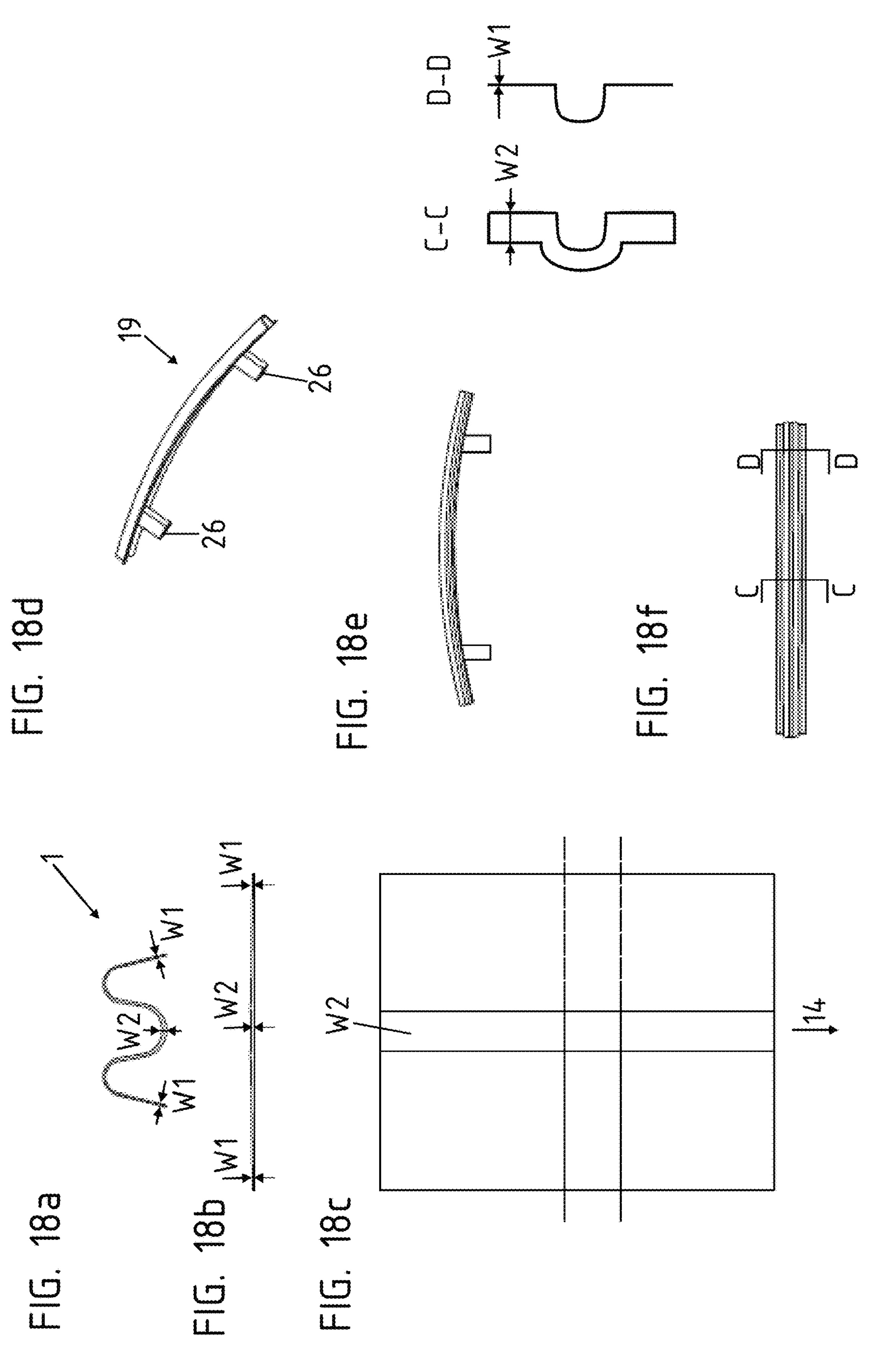
FIGS. 18*a* to 18*f* show a crossbeam.
Figures 19A, 19B, 19C, 19D:
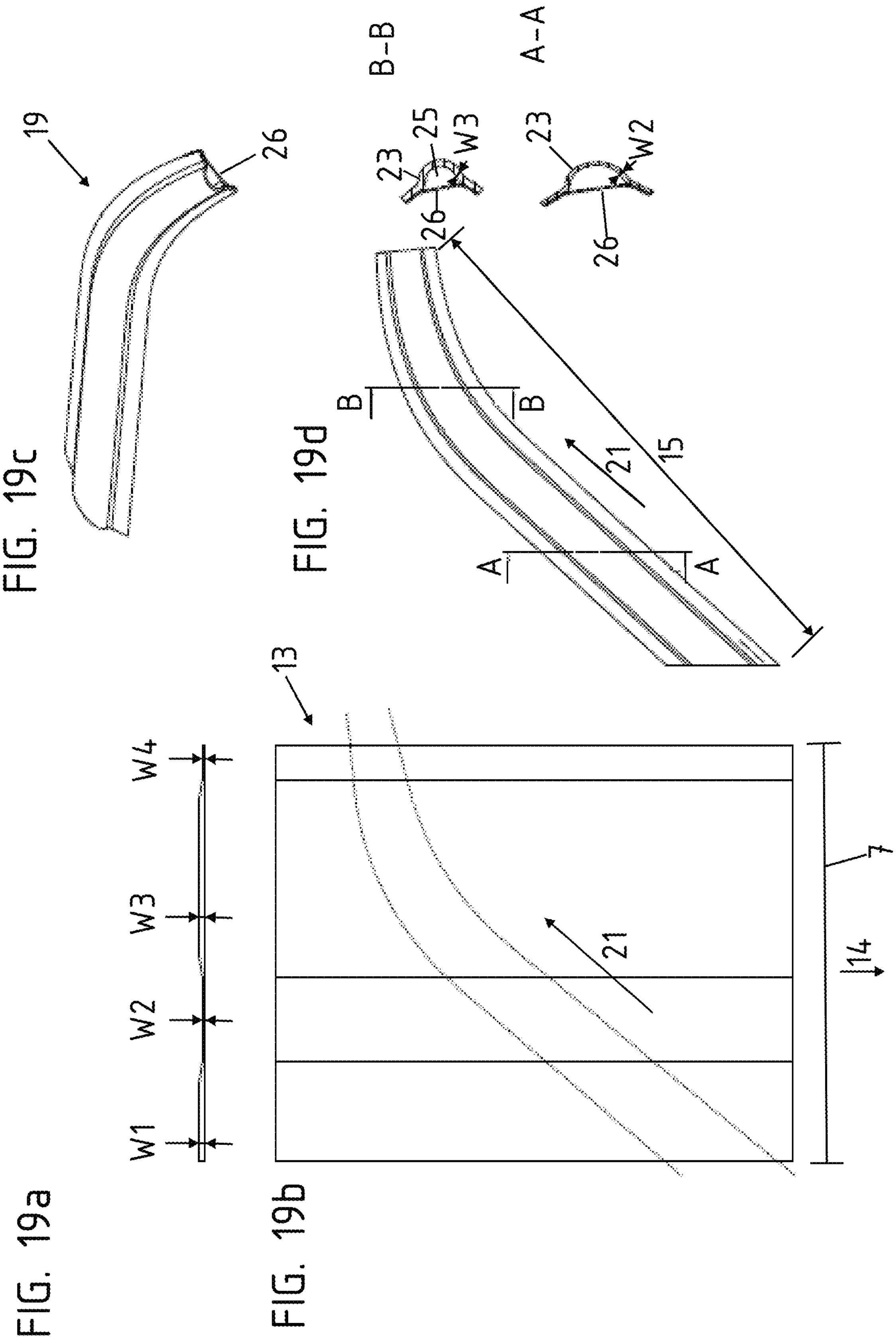
FIGS. 19*a* to 19*d* show a roof rail.

FIG. 16 likewise shows a motor vehicle component 19 in the form of a seat crossbeam. In this case, however, the component longitudinal direction 21 is formed transversely with respect to the extrusion direction 14. In the sectional illustration, the wall thicknesses W1, W2 differ from one another in the longitudinal section, wherein the wall thickness of a cross section resulting here in each case has a homogeneous profile, or as per section line A-A.

FIG. 17 shows a motor vehicle component 19 in the form of a longitudinal beam. Said longitudinal beam has a base component 23, and a hollow profile component 24 coupled to the base component 23, in sections in the component longitudinal direction 21. In FIGS. 17*a* and *b*, the base component 23 is produced firstly from a flattened extruded profile 1 with mutually different wall thicknesses W1, W2, W3, W4, W5. Said extruded profile is subsequently, as can be seen from FIGS. 17*c*, 17*d*, 17*e* and 17*f*, processed by cutting and by deformation, such that the base component 23 is produced and is coupled to the hollow profile component 24. The coupling may be produced for example by welding. A hollow profile 25 exists.

FIGS. 18*a* to *f* show a motor vehicle component 19 according to the invention in the form of a crossbeam with crash boxes 26 coupled to the crossbeam. The crossbeam itself is in this case, as per FIGS. 18*a* to *c*, firstly produced from an extruded profile 1, which in cross section has an uneven cross section, in particular an undulating or W-shaped cross section. The latter is, as per FIG. 18*b*, flattened and has two mutually different wall thicknesses W1, W2 with a respective wall thickness transition situated in between. Here, the wall thickness W1 increases to the wall thickness W2. Situated in a middle region is the wall thickness W2, which is constant over a middle section. From this, the crossbeam is then produced by processing by deformation, which crossbeam in turn has a greater wall thickness W2 as per the section line C-C than as per the section D-D, in which a relatively small wall thickness W1 prevails. In the cross section, however, the wall thickness is distributed homogeneously in each case over the entire cross section.

FIGS. 19*a* to *d* show a motor vehicle component 19 produced as a roof rail. The roof rail is in turn produced from a base component 23, which is produced by way of the extrusion method according to the invention and which consequently has mutually different wall thicknesses W1, W2, W3, W4. The component longitudinal direction 21 in this case runs variably at an angle with respect to the extrusion direction 14. Consequently, it is possible for mutually different wall thickness regions in the component longitudinal direction 21 to be formed each case homogeneously over the cross section. Altogether, a component length 15 is realized which is longer than the processing width 7 of the blank 13.

REFERENCE DESIGNATIONS

1—Extruded profile
2—Hollow chamber
3—Hollow chamber
4—Hollow chamber
5—Flange
6—Extrusion width
7—Processing width
8—Component width
9—Groove
10—Web
11—Floor panel
12—Thickness step change
13—Blank
14—Extrusion direction
15—Component length
16—Door impact beam
17—Attachment region
18—Progressive tool
19—Motor vehicle component
20—Longitudinal section
21—Component longitudinal direction
22—Recess
23—Base component
24—Hollow profile component
25—Hollow profile
26—Crash box
27—Longitudinal direction
28—Thick region
29—Thin region
F—Pressing force
W—Wall thickness
W1—Wall thickness
W2—Wall thickness
W3—Wall thickness
W4—Wall thickness
W5—Wall thickness
W6—Wall thickness
Z—Tensile force
α—Angle

The invention claimed is:

1. Method for producing a motor vehicle component, the method comprising:

extruding a 5000 series, 6000 series, or 7000 series aluminum alloy as an extruded profile having, in cross section, at least two mutually different wall thicknesses and at least one closed hollow chamber and an extrusion width, at least partially flattening and/or widening the cross section to a processing width, wherein the processing width is at least 10% greater than the extrusion width, after the flattening and/or widening, performing separation of the extruded profile to obtain a blank, processing the blank by deformation of the blank to form the motor vehicle component.

2. Method according to claim 1, wherein the at least one closed hollow chamber is still maintained after the flattening and/or widening.

3. Method according to claim 1, further comprising cutting the at least one closed hollow chamber in an extrusion direction, such that, in the extrusion direction, the closed hollow chamber is formed in portions.

4. Method according to claim 1, wherein the extruded profile further has at least one flange projecting from one side of the at least one closed hollow chamber.

5. Method according to claim 1, wherein the at least one closed hollow chamber comprises at least two closed hollow chambers which are formed adjacent to one another, or are formed so as to be connected by a web.

6. Method according to claim 1, wherein the at least one closed hollow chamber is reduced in height and/or increased in width during the widening and/or flattening.

7. Method according to claim 1, further comprising, after the separation, cutting the flattened/widened blank at an angle of between 5 and 90 degrees with respect to an extrusion direction, wherein a component length of the motor vehicle component to be produced is greater than the processing width.

8. Method according to claim 1, wherein the extruded profile has a width of 30 mm to 500 mm and a wall thickness of 1 to 10 mm.

9. Method according to claim 1, wherein the processing width is between 300 mm and 1500 mm.

10. Method according to claim 1, wherein the deformation is performed in a progressive tool.

11. Method according to claim 10, wherein the progressive tool performs at least two of the following process steps: elongating the blank, edge cutting of the blank, deformation to form the motor vehicle component, hole punching, and/or hole forming.

12. Method according to claim 1, wherein the extruded profile further has flanges projecting from two opposite sides of the at least one closed hollow chamber.

13. Method according to claim 1, further comprising, after the separation, cutting the flattened/widened blank at an angle of between 5 and 85 degrees.

14. Method according to claim 1, wherein the processing width is between 400 mm and 1500 mm.

15. Method according to claim 1, wherein the processing width is between 500 mm and 1500 mm.

16. Method according to claim 1, wherein the processing width is at least 20% greater than the extrusion width.

17. Method according to claim 1, wherein the processing width is at least 30% greater than the extrusion width.

18. Method according to claim 1, wherein the deformation is performed in a 6-stage progressive tool.

19. Method according to claim 1, wherein the at least one closed hollow chamber is flattened during the flattening and/or widening.

* * * * *